Patented July 28, 1931

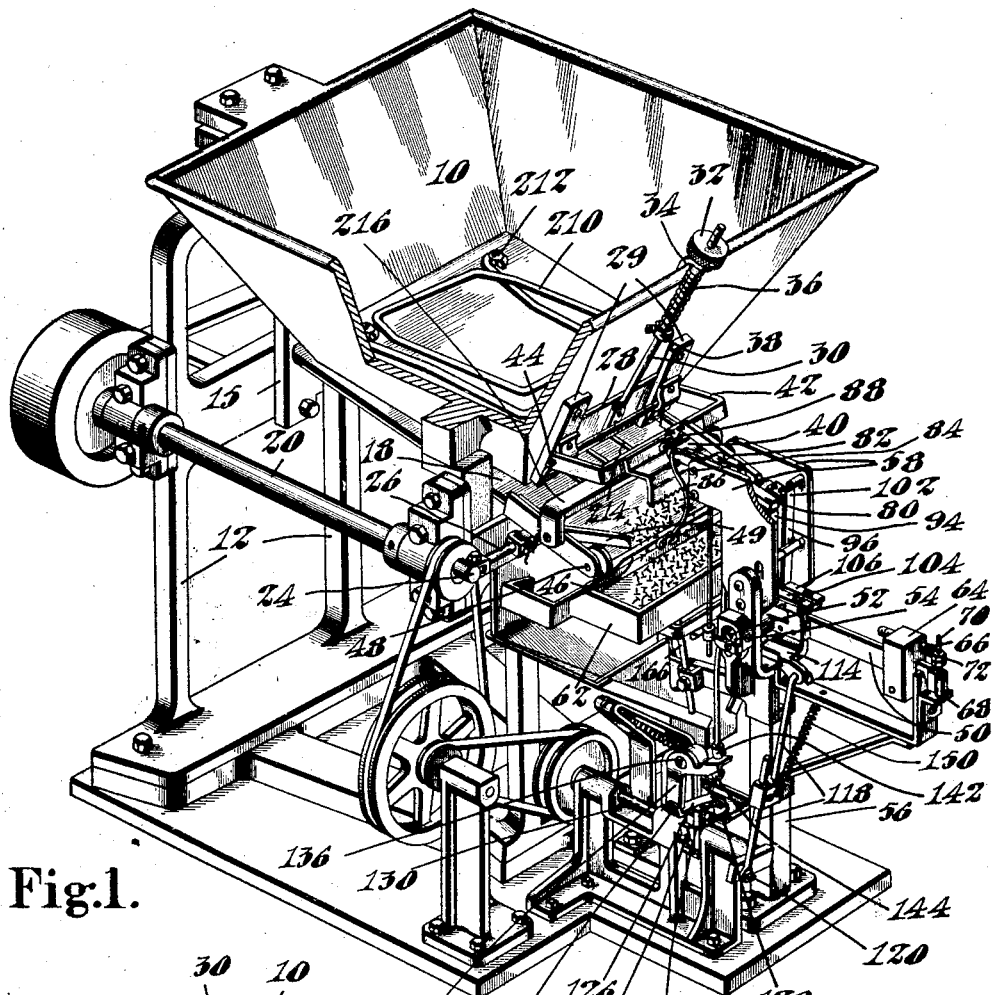
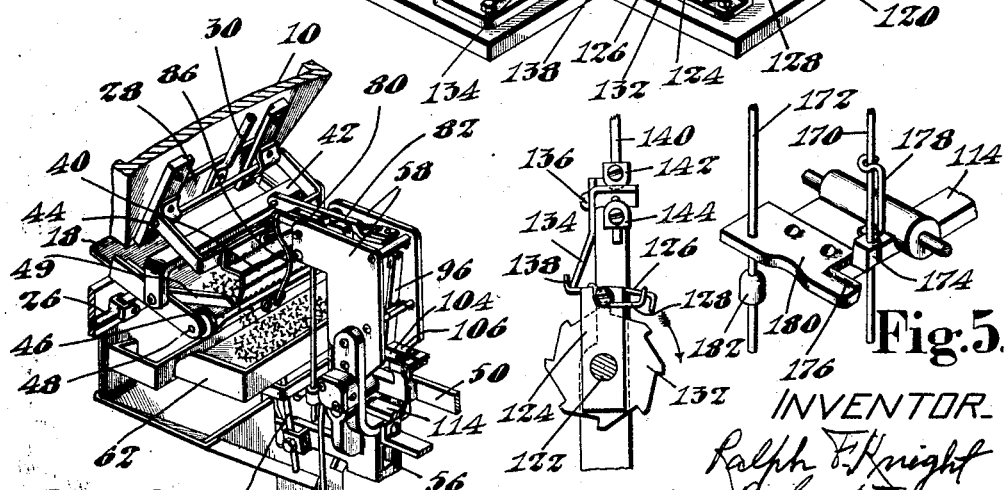

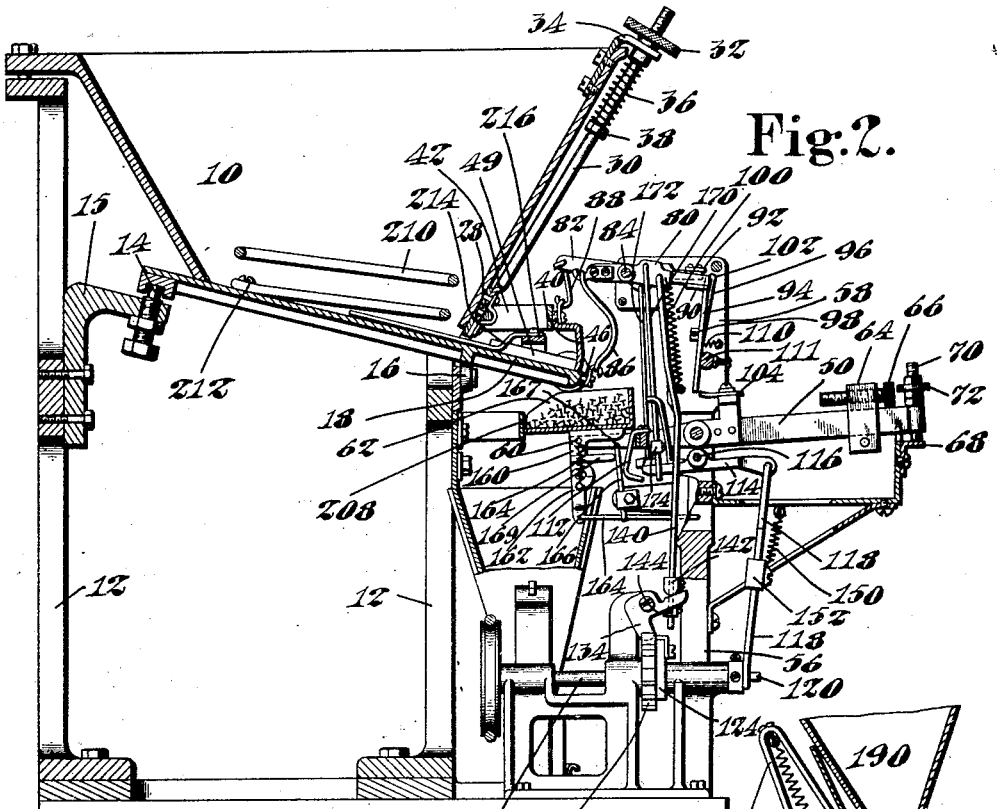
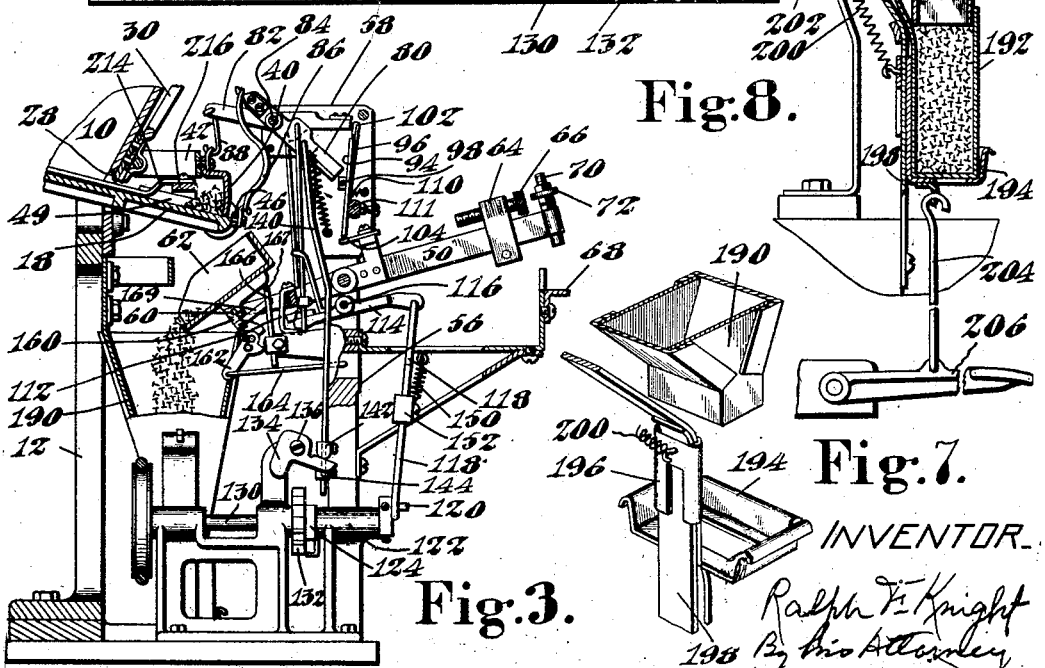

1,816,153

UNITED STATES PATENT OFFICE

RALPH F. KNIGHT, OF BEVERLY, MASSACHUSETTS, ASSIGNOR TO UNITED SHOE MACHINERY CORPORATION, OF PATERSON, NEW JERSEY, A CORPORATION OF NEW JERSEY

MEASURING MACHINE

Application filed May 25, 1923. Serial No. 641,394.

This invention relates to measuring machines and is herein disclosed as embodied in a weighing machine adapted to weigh out charges of fluent material such, for example, as tacks or nails and to deliver them into packages.

It is an object of the present invention to provide a machine of this character which will be simpler and less cumbersome than automatic weighers now in general use and which will be inexpensive to manufacture, rugged in construction, and both rapid and accurate in operation. With these objects in view, the herein disclosed machine is provided with a pair of gates, arranged to control the passage of material from a hopper to a scale pan, having controlling mechanism of such a nature that one of the gates is closed after the major portion of a charge of material has passed into the scale pan, a much smaller stream of material continuing to flow and being finally cut off by the other gate when the charge has been completely weighed out.

Features of the invention comprise novel mechanism, illustrated as under the control of the scale beam, for controlling the gates and thus for controlling the passage of material to the scale pan; novel mechanism for effecting the dumping of a charge from the scale pan; novel means for ensuring that the scale beam rocks through a predetermined angle, sufficient to effect the dumping of a load after a charge has been completely weighed out; novel mechanism for returning the beam to horizontal position and for returning the scale pan to charge receiving position after a charge has been dumped; and a novel support for a receptacle in which the charge is to be received.

While the invention is herein described with reference to a weighing machine particularly designed for use in packaging tacks and nails, it is to be understood that the invention is not limited to such a machine since in various of its aspects it is applicable to measuring machines of other types and to machines for purposes other than measuring.

With the above and other features in view, the invention will now be described in connection with the accompanying drawings, which illustrate a preferred embodiment thereof, and pointed out in the claims.

In the drawings,

Fig. 1 is a perspective view of a weighing machine embodying the present invention, showing both of the material controlling gates in position to permit the passage of material;

Fig. 2 is a longitudinal section of the same machine showing the primary gate closed and the secondary gate open;

Fig. 3 is a longitudinal section of a portion of the machine showing both gates closed and the scale pan in the act of dumping;

Fig. 4 is a perspective view of the gates of the machine and certain associated parts, with the parts in the same positions as in Fig. 2;

Figs. 5 and 6 are detail views of parts of the controlling mechanism;

Fig. 7 is a perspective view and Fig. 8 a vertical section of a work support arranged to hold a receptacle to be filled, together with a funnel for directing material to the receptacle.

The illustrated machine is of that type in which the material to be weighed out, illustrated as tacks, is caused to flow in a large stream until the major portion of a charge has been weighed out, after which the flow of material is much reduced so that the weighing of the charge is completed by the passage of a small stream of material. This machine is provided with a scale beam carrying upon one arm a scale pan arranged to receive the charge and upon the other arm a primary weight directly carried by the beam and effective to counterbalance the major portion of the charge to be weighed out and a secondary weight, carried while the beam is horizontal by a supplemental support, arranged to become effective upon the scale beam by the first rocking of the beam when the major portion of the charge has been weighed out and to restrain the scale beam from further rocking until the charge has been completely weighed out. Thus the rocking of the scale beam through a small angle at the time that the secondary weight becomes effective, operates through suitable connections to reduce the flow of material, further rocking of the scale beam when the charge has been completely weighed out being effective completely to shut off the flow of the material.

In the drawings, the machine is illustrated as provided with a hopper 10 carried by a frame 12. The bottom of the hopper, as shown in Fig. 2, is pivoted at 14 to a bracket 15 carried by frame 12 and is carried at its other end by rolls 16. The lower end of the hopper bottom forms a chute 18 which serves to conduct material from the hopper 10 to a suitable receptacle, such as a scale pan 62. Chute 18 is oscillated transversely from a suitable source of power, illustrated as a drive shaft 20 provided with a crank pin 24 connected to the chute 18 by a connecting rod 26. A manually adjustable gate 28 is provided to control the passage of the tacks from the hopper to the chute 18. As illustrated, the gate 28 is mounted for sliding movement in ways 29 carried by hopper 10 and is attached to the lower end of a threaded rod 30 carrying a knurled nut 32 having a bearing in a stationary support 34 so that upon rotation of the nut 32 the rod 30 and the gate 28 may be adjusted toward or from the bottom of hopper 10. A spring 36 bearing at its lower end against a collar 38 carried by the rod 30 and at its upper end against the support 34 yieldingly holds gate 28 in position.

A primary or main gate 40 carried by a bail 42 pivoted at 44 to the front wall of the hopper 10 is effective when closed to obstruct but not completely to shut off the passage of tacks through the chute 18. A secondary gate 46 is pivoted at 48 to chute 18 and when closed completely cuts off the passage of tacks. As illustrated a pair of deflectors 49 are used to control the passage of tacks through chute 18 and to direct them to gates 40 and 46.

The machine is provided with a scale beam 50 having a pair of knife edges 52 (Fig. 1) carried by suitable bearings 54 supported by a post 56. At its upper end post 56 is provided with a pair of parallel, approximately L-shaped, flat plates 58 which serve to support parts of the gate controlling mechanism. Pivoted at 60 to one arm of the scale beam is a scale pan 62. Carried by the other arm of the scale beam is an adjustably mounted weight 64 provided with an adjusting screw 66. This weight is to be adjusted into position so that the scale beam will rock when the major portion but not quite all of a charge has been weighed out into the scale pan. Beneath the extreme end of the right hand arm of the scale beam is a support 68 upon which rests a secondary or supplemental weight 70. The latter is in the form of a short threaded rod passing loosely through a hole in the end of the scale beam and carrying near its upper end an adjustable nut 72, the arrangement being such that when the scale beam rocks through a small arc after weight 64 has been overbalanced, the scale beam will pick up weight 70 and thus be prevented from further rocking until a charge has been completely weighed out. By the adjustment of nut 72 the angle through which the scale beam will rock before it picks up weight 70 may be varied. As illustrated, a lock nut prevents undesired movement of nut 72.

Means will now be described by which gates 40 and 46 are closed and opened at the proper times during the weighing out of a charge. A pair of levers 80 and 82 are pivotally mounted upon rod 84 carried by plates 58. Lever 80 is connected by a link 86 with gate 46 while lever 82 is connected by a link 88 with the gate 40. At the under side of its rear end lever 80 is provided with a latch block 90 while lever 82 is provided at the upper side of its rear end with a corresponding latch block 92. A pair of latches 94 and 96 are pivotally carried by a rod 98 extending between plates 58, the upper end of latch 94 being arranged when gate 46 is open to bear against block 90, a spring 100 connected at one end to lever 80 and at the other end to one or both of the plates 58 tending to hold lever 80 in that position. Latch 96 is provided with a hook-shaped upper end 102 arranged to engage over block 92 to hold gate 40 in open position. The right hand arm of scale beam 50 is provided with a pair of trip members 104 and 106 illustrated as leaf springs and arranged to operate latches 94 and 96, respectively, their positions being such that when weight 64 is over-balanced and scale beam 50 begins to rock, trip member 106 will engage the lower end of latch member 96 rocking the latter in a clockwise direction, as viewed in Fig. 2, so that lever 82 is released, as shown in Fig. 2, thus permitting gate 40 to close under the influence of gravity. Further movement of the scale beam at this time is prevented by the secondary weight 70 until the latter is over-balanced by the charge which is completed by the flowing of a smaller stream of material around the gate 40. When the weighing of the charge is completed and scale beam 50 is further rocked, trip member 104 engages the lower end of latch member 94 rocking the latter in a clockwise direction, as viewed in Figs. 1 and 2, and thus moving its upper end out of engagement with block 90. This permits lever 80 to rock in a clockwise direction, as viewed in Fig. 2, under the influence of spring 100, thus closing gate 46 and completely shutting off the flow of tacks. A tension spring 110 is provided for each of the latch members 94 and 96, arranged to act in opposition to trip members 104 and 106. A stop 111 limits the movement of the latch members under the influence of their springs 110.

In order to ensure that the scale beam 50 shall rock through a sufficient angle to ensure the dumping of the charge from the scale pan, the beam is provided with a finger 112, the lower end of which extends into the path of movement of a lever 114 fulcrumed at 116 (Figs. 2 and 3) to the column 56.

The other end of lever 114 is connected to the upper end of a rod 118 made up, for purposes of adjustment, of two parts. The lower end of rod 118 is connected to a crank pin 120 carried by one end of a shaft 122 (Figs. 3 and 6) at the other end of which is an arm 124 pivoted to which is a pawl 126 (Figs. 1 and 6) provided with a spring 128 tending to rock it in a clockwise direction, as viewed in Fig. 6. A shaft 130 is continuously rotated from shaft 20 through suitable means illustrated as a series of pulleys and belts. Upon the end of shaft 130 adjacent to shaft 122 is a ratchet wheel 132, arranged in position for engagement by pawl 126 when the latter is free to move under the action of its spring 128. A bell crank lever 134 fulcrumed at 136 has its end normally in the path of movement of pawl 126, the latter being provided with an upturned tail 138 as shown in Fig. 6. A rod 140 is provided with a pair of adjustable collars 142, 144 between which passes one of the arms of bell crank lever 134, the upper extremity of rod 140 being connected to lever 80 (Figs. 2 and 3) so that as lever 80 is rocked to close gate 46, at the completion of the weighing out of a charge of tacks, bell crank lever 134 will be rocked in a clockwise direction, as viewed in Figs. 1, 2, and 3, so as to release pawl 126 which, under the influence of its spring 128, moves into engagement with ratchet 132, whereupon shaft 122 is rotated. Mechanism hereinafter described disengages pawl 126 from ratchet 122 at the conclusion of a single revolution of shaft 122. As shaft 122 is rotated, lever 114 is rocked, its left hand end engaging finger 112 and ensuring sufficient rocking of the scale beam 50 to dump the load from the scale pan. A spring 150 anchored at one end to a block 152 forming a connection between the two portions of rod 118 is effective to assist in the rocking of lever 114, the spring being tensioned by the power mechanism during the return of lever 114 to its normal position.

The scale pan 62 has rigidly secured to the under side of its bottom one arm of a toggle member 160 (Figs. 2 and 3), the cooperating member 162 of the toggle being connected by a link 164 with column 56. A spring 165 tends normally to hold the toggle straightened with the pivotal connection of the two toggle members slightly beyond the dead center. When the beam 50 is rocked at the conclusion of the weighing out of a charge, toggle member 160 is rotated bodily about the fulcrum of the scale beam while the lower end of the toggle member 162 is held against transverse movement by link 164. Thus the pivot of the toggle members is moved to the right, as viewed in Fig. 2, past the dead center so that the toggle can break to permit the tilting of the scale pan and the dumping of the load. To ensure this action, a stationary but adjustable rod 166, carrying at its upper end a cross bar 167 parallel to the axis about which the scale beam 50 rocks, is arranged to contact with the bottom of the scale pan as the scale beam 50 is rocked so as to tilt the scale pan about its pivot 60. As the scale beam returns to horizontal position after the charge has been dumped, the toggle straightens itself so that the pivotal connection of its members moves past the dead center to normal position, a finger 169, carried by toggle member 160, contacting with rod 167 to ensure the return of the scale pan to horizontal position.

It is necessary to open gates 40 and 46 to permit the passage of material as the scale pan 62 returns to position after the dumping of the charge. With this in view the levers 80 and 82 are provided with rods 170 and 172 (Fig. 2) respectively, the former being provided with a block 174 (Fig. 5) arranged to be picked up by a shoulder 176 carried by lever 114 as the latter returns to horizontal position. A resilient wire 178 serves yieldingly to hold rod 170 in proper relation to shoulder 176. As illustrated, shoulder 176 is formed upon a plate 180 carried by the left hand extremity of lever 114. The rod 172 passes through a hole in plate 180 and is provided beneath plate 180 with a collar 182. It follows that as lever 114 is rocked to ensure sufficient rocking of scale beam 50 at the time of dumping of a charge, rod 172 will be depressed, thus opening gate 40. It should be noted that gate 46 has been closed just prior to this. On the other hand, as lever 114 returns to the horizontal position after the charge has been dumped, shoulder 176 picks up block 174, thus elevating rod 170 and rocking lever 80 in a counterclockwise direction so as to open gate 46. As the lever 80 is rocked in a counterclockwise direction, it will raise the rod 140 and thus rock the bell crank lever 134 in a counterclockwise direction and cause the latter to engage the tail 138 of the pawl 126. The pawl 126 is thus disengaged from the ratchet wheel 132 at the completion of a single revolution of the shaft 122, and the shaft 122 is maintained stationary until the scale beam 50 is again tilted by a load of tacks.

A large funnel 190 is positioned to receive a charge of material as it is dumped from the scale pan 62 to conduct it to a package 192 (Fig. 8) which, as illustrated, is carried by a support 194 (Figs. 7 and 8). The support 194 is provided with a sleeve 196 mounted for sliding movement on upright 198, a tension spring 200 being secured at one end to sleeve 196 and at the other end to a support 202 so as to hold support 194 with a package in receiving relation to the mouth of the funnel 190. A rod 204 connects support 194 with a treadle 206 so that the support 194 may conveniently be lowered against the tension of spring 200 for the insertion or removal of a package.

In order to prevent material spilling from the scale pan 62 prior to the dumping of a charge, a plate 208 closes the open end of the scale pan as shown in Fig. 2.

To prevent arching of the material in the hopper 10 a resilient bent or coiled rod 210 is provided loosely attached at its extremities, as shown at 212, to the bottom of the hopper. As illustrated, rod 210 is bent in the form of a complete approximately rectangular loop and three sides of a second loop. When the hopper is full of tacks, particularly those of a character which tend to mass together or arch, the upper parts of this resilient rod or spring 210 cannot move to any substantial extent until such time as the tacks have worked their way down around it and out through the door. As the tacks clear rod 210 more and more, its motion gradually increases and this increase of motion tends to bring more tacks down upon the rod 210 and in a position to pass out through the door of the hopper. This resilient action of rod 210 together with its loose connection to the bottom of the hopper is peculiarly helpful in maintaining a practically constant flow of tacks through the door of the hopper.

A group of resilient ticklers 214, attached at one end to chute 18, and at the other to a bail 216 carried by chute 18, prevent clogging of the tacks as they flow from hopper 10 towards gate 40.

Having described the invention, what I claim as new and desire to secure by Letters Patent of the United States is:

1. A machine of the class described having, in combination, a source of supply of fluent material, a receptacle, a pair of gates controlling the passage of material from the source of supply to the receptacle, the first gate being arranged when closed to reduce the flow of material and the second gate being arranged when closed to cut off the flow of material completely, irrespective of the position of the first, controlling means for the gates arranged to close the first gate to reduce the flow of material when the major portion of a charge has been measured out and to close the second gate to cut off the flow of material completely when a charge has been completely measured out, and power-operated means to open the gates for the measuring out of another charge of material.

2. A measuring machine having, in combination, a source of supply of fluent material, a receptacle, a chute arranged to conduct a single stream of material to said receptacle, a pair of gates mounted for movement in opposite directions to control the passage of said stream of material from the chute to the receptacle, a pair of levers controlling the position of the respective gates, a link connecting each lever with the corresponding gate, and connections from the levers to the receptacle arranged to cause one of the gates to close and thereby reduce the flow of material from the chute when the major portion of a charge has been measured out and to cause the other gate to close to shut off the flow of material completely when a charge has been completely measured out.

3. A measuring machine having, in combination, a source of supply of fluent material, a receptacle, a pair of gates controlling the passage of material from the source of supply to the receptacle, a latch for each gate arranged to latch the gates in open position, and controlling means for the gates arranged to unlatch one gate and move that gate in one direction to reduce the flow of material when the major portion of a charge has been measured out and to unlatch the other gate and move that gate in the opposite direction to cut off the flow of material completely when a charge has been completely measured out.

4. A measuring machine having, in combination, a source of supply of fluent material, a receptacle, a pair of gates controlling the passage of material from the source of supply to the receptacle, the first gate being arranged when closed to reduce the flow of material and the second gate being arranged when closed to cut off the flow of material completely, irrespective of the position of the first, mechanism controlled by the quantity of material in the receptacle arranged to close the first gate to reduce the flow of material when the major portion of a charge has been measured out and to close the second gate to cut off the flow of material completely when a charge has been completely measured out, a continuously rotated shaft, and connections between said shaft and the gates to open the gates for the measuring out of another charge of material.

5. A weighing machine having, in combination, a source of supply of fluent material, a scale beam, a scale pan carried thereby, two weights arranged to be lifted in succession when the scale beam rocks, a pair of gates controlling the passage of material from the source of supply to the scale pan, means for controlling the gates constructed and arranged to close the first gate and thus substantially to reduce the flow of material when the major portion of a charge has been weighed out and the first weight lifted and to close the second gate when the charge has been completely weighed out and the second weight lifted and means for opening the first gate subsequently to the completion of the weighing out of a charge but while the second gate still remains closed.

6. A weighing machine having, in combination, a source of supply of fluent material, a scale beam, a scale pan carried thereby, a pair of gates controlling the passage of material from the source of supply to the scale pan, connections between the scale beam and the gates arranged to close the first gate and thereby to reduce the flow of material when the major portion of a charge has been weighed out and to close the second gate to shut off the flow of material when a charge has been completely weighed out, and means controlled by the tilting of the beam for thereafter opening the first gate and tilting the scale pan to dump the load.

7. A weighing machine having, in combination, a source of supply of fluent material, a scale pan, a pair of gates controlling the passage of material from the source of supply to the scale pan, and controlling means for the gates arranged to lower one gate to reduce the flow of material when the major portion of a charge has been weighed out and to raise the other gate to cut off the flow of material completely when a charge has been completely weighed out.

8. A weighing machine having, in combination, a source of supply of fluent material, an inclined chute leading therefrom, a scale beam, a scale pan carried thereby and positioned to receive material from the chute, a gate controlling the passage of material from the chute to the scale pan and arranged to be lowered against the inclined chute, a lever arranged by its rocking to open and close said gate, and a latch under the control of the scale beam and arranged when the beam is horizontal to latch the lever in position to hold the gate open.

9. A weighing machine having, in combination, a source of supply of fluent material, a scale beam, a scale pan carried thereby, a gate arranged to control the passage of material from the source of supply to the scale pan, a lever arranged by its rocking to control the opening and closing of the gate, a latch controlled by the scale beam and arranged, when the scale beam is horizontal and until the scale beam is rocked through a small angle, to engage said lever thereby latching said lever in position to cause said gate to remain in open position, and power-operated means for rocking said lever to its gate opening position.

10. A weighing machine having, in combination, a source of supply of fluent material, a scale beam, a scale pan carried thereby, a gate arranged to control the passage of material from the source of supply to the scale pan, a lever arranged by its rocking to control the opening and closing of the gate, a latch arranged, when the scale beam is horizontal or is rocked through only a very small angle, to latch said lever in position to cause said gate to remain in open position, a trip carried by the scale beam and arranged to trip the latch and release the lever when the scale beam is rocked through a larger angle, and means rendered operative by the rocking of the beam through a small angle to ensure its rocking through a predetermined larger angle.

11. A weighing machine having, in combination, a source of supply of fluent material, a scale beam, a scale pan carried thereby, a gate for controlling the flow of material from the source of supply to the scale pan, connections from the scale beam to the gate arranged to hold the gate out of the path of the flow of material when the scale beam is horizontal and to permit the gate to obstruct the flow of material when the beam is rocked, a continuously rotating shaft, connections from the shaft to the beam, and means rendered operative by the rocking of the beam through a small angle to cause said connections to transmit power from the shaft to the beam to ensure the prompt rocking of the beam through a predetermined larger angle.

12. A weighing machine having, in combination, a source of supply of fluent material, a scale beam, a scale pan carried thereby, a pair of gates controlling the passage of material from the source of supply to the scale pan, a pair of levers, each lever being connected with one of the gates, a latch for each lever, and a pair of trips carried by the scale beam, one of them arranged to trip one of the latches and thereby to control the closing of one of the gates as soon as the scale beam commences to rock and the other arranged to trip the other latch member and thereby control the closing of the other gate after the beam has rocked through a small angle.

13. A weighing machine having, in combination, a source of supply of fluent material, a scale beam, a scale pan carried thereby, a pair of gates controlling the passage of material from the source of supply to the scale pan, a pair of levers arranged to control the positions of the respective gates, connections from the scale beam to one of the levers arranged to cause the first gate to be lowered to closed position when the scale beam commences to rock, connections from the scale beam to the other lever arranged to cause the second gate to close and the first gate to be raised to open position after the scale beam has rocked through a small angle, and means arranged to open the second gate when the scale beam returns to horizontal position.

14. A weighing machine having, in combination, a source of supply of fluent material, a scale beam, a scale pan carried thereby, a pair of gates controlling the passage of material from the source of supply to the scale pan, a pair of levers arranged to control the positions of the respective gates, connections from the scale beam to one of the levers arranged to cause one of the gates to close when the scale beam commences to rock, connections from the scale beam to the other lever arranged to cause the other gate to close after the scale beam has rocked through a small angle-power-operated means arranged to ensure the rocking of the beam through a predetermined angle and its prompt return to receiving position, and means arranged to cause both gates to open by the time the scale beam returns to horizontal position.

15. A weighing machine having, in combination, a source of supply of fluent material, a scale beam, a scale pan carried thereby, a pair of gates controlling the passage of material from the source of supply to the scale pan, a pair of levers arranged to control the positions of the respective gates, connections from the scale beam to one of the levers arranged to cause one of the gates to close when the scale beam commences to rock, connections from the scale beam to the other lever arranged to cause the other gate to close after the scale beam has rocked through a small angle, means for causing the first gate to open when the second gate closes, and means for causing the second gate to open when the scale beam returns to horizontal position.

16. A weighing machine having, in combination, a source of supply of fluent material, a scale beam, a scale pan, a weight carried permanently by the scale beam, a second weight operatively connected to the scale beam, a support arranged to carry the second weight when the scale beam is horizontal and to permit the scale beam to pick up the second weight after the scale beam has rocked through a small angle, a pair of gates controlling the passage of material from the source of supply to the scale pan, power-operated means to ensure the rocking of the beam through a predetermined angle and to ensure its prompt return to receiving position, and latch and lever mechanism connecting the gates and the scale beam arranged to cause one gate to close when the scale beam commences to rock and to cause the other gate to close when the scale beam picks up the second weight.

17. A weighing machine having, in combination, a source of supply of fluent material, a scale beam, a scale pan, a weight carried permanently by the scale beam, a second weight operatively connected to the scale beam, a support arranged to carry the second weight when the scale beam is horizontal and to permit the scale beam to pick up the second weight after the scale beam has rocked through a small angle, a pair of gates arranged to control the passage of material from the source of supply to the scale pan, a lever connected to each of the gates, a latch member for each lever arranged to hold the levers in position to maintain the gates open, and means for tripping one latch when the scale beam commences to rock thereby closing one of the gates and for tripping the other latch when the lever continues its rocking after picking up the second weight so as to close the second gate.

18. A weighing machine having, in combination, a scale beam, a scale pan carried by one end thereof, and means arranged positively to pull down said end of the beam when a charge has been weighed out, thereby ensuring that the beam rocks through a predetermined angle.

19. A weighing machine having, in combination, a scale beam, a scale pan carried by one end thereof, and means controlled by rocking of the beam positively to pull down said end of the beam thereby ensuring continued rocking of the beam through a predetermined angle.

20. A weighing machine having, in combination, a scale beam, a continuously rotated shaft, a second shaft connected to the first by a clutch and means controlled by the rocking of the beam to actuate said clutch and thereby to cause the second shaft to transmit power to continue the rocking of the beam through a predetermined angle.

21. A weighing machine having a weighted scale beam, a scale pan carried thereby, power-operated means for tilting the scale pan in one direction when the scale beam rocks through a predetermined angle, and means to ensure the return in the direction opposite to said direction of tilting of the scale pan to its normal position.

22. A weighing machine having, in combination, a scale beam, a scale pan carried thereby, means for conducting material to the scale pan, and means operative after the beam has rocked through a small angle to continue the rocking of the beam through a mechanically predetermined angle with the subsequent addition of material to that already in the scale pan.

23. A weighing machine having, in combination, a scale beam, a scale pan carried thereby, and power-operated means controlled by the rocking of the beam arranged to continue the rocking of the beam through a predetermined angle and to dump the scale pan.

24. A weighing machine having, in combination, a scale beam, means controlled by the rocking of the beam to ensure continued rocking of the beam through a predetermined angle, and means for returning the beam to horizontal position after it has been rocked through said angle.

25. A weighing machine having, in combination, a scale beam, a scale pan carried thereby, means controlled by rocking of the beam to ensure continued rocking of the beam through a predetermined angle, means for dumping the receptacle when the beam has rocked through said angle, and power-operated means for returning the beam to horizontal position.

26. A weighing machine having, in combination, a scale beam, power-operated means controlled by the rocking of the beam and arranged to cause the beam to continue rocking through a predetermined angle, and power-operated means for returning the beam to horizontal position.

27. A weighing machine having, in combination, a scale beam, a scale pan carried thereby, power-operated means controlled by the scale beam to ensure continued rocking of the scale beam through a predetermined angle, and means for discharging the scale pan arranged to ensure its dumping when the scale beam is rocked through a predetermined angle.

28. A weighing machine having, in combination, a scale beam, a scale pan carried thereby, and power-operated means controlled by the rocking of the beam to ensure continued rocking of the beam through a predetermined angle to dump the receptacle when the beam has been rocked through said angle, and to return the beam and the scale pan to receiving position.

29. A weighing machine having, in combination, a source of supply of fluent material, a scale pan, a gate controlling the passage of material from the source of supply to the scale pan, a scale beam carrying the scale pan, means for closing the gate when a charge of material has been weighed out into the scale pan, and means for returning the scale beam to receiving position and opening the gate preparatory to the weighing out of a charge of material comprising a source of power, a single-revolution clutch and connections from the clutch to the scale beam and the gate arranged to return the scale beam to horizontal position and to open the gate as the scale beam is thereby returned to horizontal position.

30. A weighing machine having, in combination, a scale beam, a scale pan carried thereby, and means for tilting the scale pan to dump its charge when a charge has been weighed out into the pan comprising a source of power, a single-revolution clutch and connections arranged to throw the clutch into power-transmitting condition, when the beam is rocked through a predetermined angle, to dump the receptacle.

31. A weighing machine having, in combination, a scale beam, a scale pan carried thereby, a gate for controlling the passage of material to the scale pan, a lever, connections from the gate to the lever, a source of power, means operated from the source of power to ensure the rocking of the scale beam through a predetermined angle, and connections between the lever and the source of power arranged to open the gate at a suitable interval after a charge of material has been weighed out.

32. A weighing machine having, in combination, a scale beam, a finger carried thereby, a lever having one of its ends arranged in proximity to said finger, and power-operated means for rocking the lever through a predetermined angle when the scale beam rocks through a small angle, said lever and said finger being arranged for engagement when the lever is rocked to insure continued rocking of the scale beam through a predetermined angle.

33. A weighing machine having, in combination, a scale beam, a scale pan carried thereby, and means for insuring the rocking of the scale beam through a predetermined angle when a charge has been weighed out comprising a lever, a single-revolution clutch, connections from the clutch to the lever arranged to rock the lever when the clutch is thrown into power-transmitting condition, connections from the scale beam to the clutch arranged to throw the clutch into power-transmitting condition when the scale beam is rocked through a small angle, and connections from the scale beam to the lever arranged to cause the scale beam to rock through a predetermined angle when the lever is rocked.

34. A weighing machine having, in combination, a scale pan, a gate for controlling the passage of material to the scale pan, means for closing the gate when a charge of material has been weighed into the scale pan, means for dumping the scale pan, and power-operated means for ensuring the return of the scale pan to material receiving position comprising a single-revolution clutch, connections from the gate to the clutch arranged to throw the clutch into power-transmitting condition as the gate is closed, and connections from the clutch to the scale beam arranged to ensure continued rocking of the scale beam through a predetermined angle to dump the scale pan.

35. A weighing machine having, in combination, a source of supply of fluent material, a scale beam, a scale pan carried thereby, a pair of gates controlling the passage of material from the source of supply to the scale pan, means for closing one of the gates when the major portion of a charge of material has been weighed, means for closing the other gate when a charge has been completely weighed out, means for opening the first gate as the second gate is closed, and power-operated means for opening the second gate to permit the passage of material to the scale pan including a single-revolution clutch, means for throwing the clutch into power-transmitting condition as the second gate is closed, and connections from the clutch to the second gate arranged to open the second gate before the clutch is disconnected at the completion of a revolution thereof.

36. A weighing machine having, in combination, a scale beam, a scale pan pivoted thereto, means normally preventing tilting of said scale pan relatively to said scale beam, and a stationary stop normally out of engagement with the scale pan and arranged to engage and positively to tilt the scale pan about its pivot when the scale beam is rocked through a predetermined angle thereby to ensure discharge of the scale pan.

37. A weighing machine having, in combination, a scale beam, a scale pan pivoted thereto, a toggle, one member of which is rigidly connected to the scale pan, and a link connected at one end to the other toggle member and connected at the other end to a stationary support so that as the scale beam is rocked the toggle will break, thereby tilting the pan and discharging its load.

38. A weighing machine having, in combination, a scale beam, a scale pan pivoted thereto, a toggle, one member of which is rigidly connected to the scale pan, a link connected at one end to the other toggle member and connected at the other end to a stationary support so that as the scale beam is rocked the toggle will break thereby tilting the pan and discharging its load, and a spring connected to the two toggle members and arranged, as the toggle is broken, to move past the dead center so that the spring tends to hold the toggle either straightened or broken in whichever position it may be.

In testimony whereof I have signed my name to this specification.

RALPH F. KNIGHT.